No. 684,050. Patented Oct. 8, 1901.
H. FALCONNET & M. PERODEAUD.
MANUFACTURE OF TIRES FOR VEHICLE WHEELS, &c.
(Application filed Jan. 15, 1901.)
(No Model.)
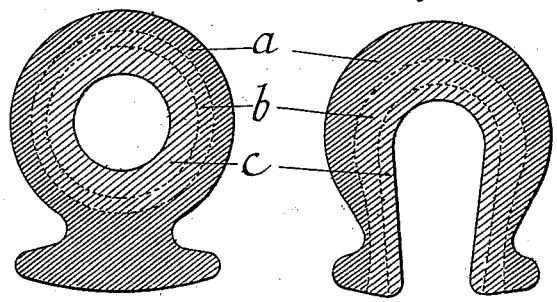
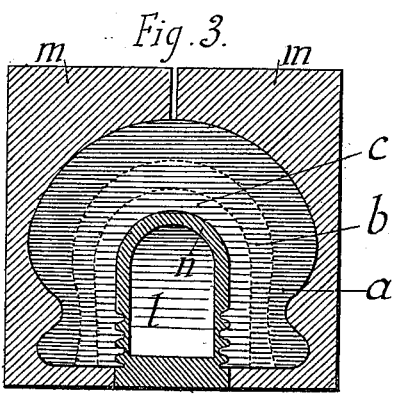
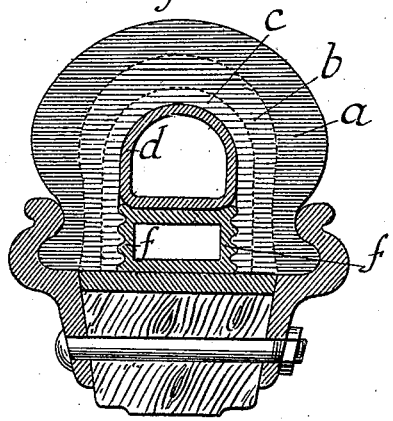
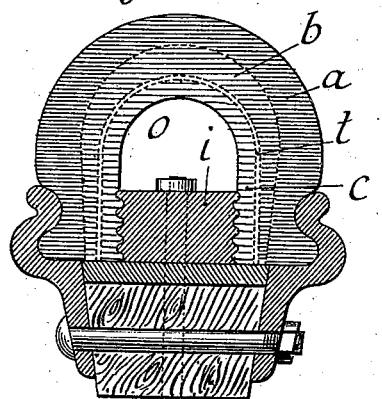
WITNESSES:
INVENTORS
Henri Falconnet
Maurice Perodeaud
BY
ATTORNEYS

United States Patent Office.

HENRI FALCONNET AND MAURICE PERODEAUD, OF CHOISY-LE-ROI, FRANCE.

MANUFACTURE OF TIRES FOR VEHICLE-WHEELS, &c.

SPECIFICATION forming part of Letters Patent No. 684,050, dated October 8, 1901.

Application filed January 15, 1901. Serial No. 43,302. (No model.)

*To all whom it may concern:*

Be it known that we, HENRI FALCONNET and MAURICE PERODEAUD, engineers, citizens of the Republic of France, residing at Choisy-le-Roi, in the Republic of France, have invented certain new and useful Improvements in the Manufacture of Tires for Vehicle-Wheels, &c., of which the following is a specification.

In our Patent No. 640,644, dated January 2, 1900, a process is described which enables us to impart to an article made of commercial india-rubber, whether pure or mixed, such as a tire for vehicle-wheels, a resiliency which increases from the outside toward the inside. In that patent it was stated that in principle our invention consisted in subjecting the article to a series of successive vulcanizations alternating with subsequent congelations or refrigerations, and we particularly described the application of our invention to solid tires.

The present invention has for its object an improvement, or rather a simplification, which we have introduced in this process for its particular application to hollow bodies, closed or open, such as hollow india-rubber tires without air-chambers or the covers of pneumatic tires.

In the accompanying drawings, Figure 1 is a transverse section of one form of tire constructed in accordance with our invention. Fig. 2 is a similar view of another form of tire. Fig. 3 is a sectional view showing a cover or tire, such as Fig. 2, in place in the baking-mold. Figs. 4 and 5 are cross-sectional views of tires in place upon the rims, Fig. 4 showing an inner air-tube and Fig. 5 with such inner tube omitted.

In order to produce in hollow tires, such as are shown in transverse section in Fig. 1 of the accompanying drawings, or in covers of pneumatic tires, such as the one shown in transverse section in Fig. 2, zones $a$ $b$ $c$ of a resiliency or flexibility increasing from the periphery to the center, we employ for molding these articles a hollow core in which we cause a liquid of very low temperature to circulate, such as chlorid of calcium.

Fig. 3 shows in transverse section a cover, such as that of Fig. 2, in position in the mold which serves for baking it. $n$ is the hollow core in which we cause a liquid $l$ to circulate at a very low temperature. It is sufficient to subject the whole to successive vulcanizations or bakings of decreasing duration. By allowing the first vulcanization to spread from the exterior of the cover to the neighborhood of the internal zone, as far as the core $n$ of low temperature permits, we reserve a zone $c$, less baked or not baked at all, in which the india-rubber preserves its condition of plasticity which is natural to the crude rubber. Successive vulcanizations of less and less depth, during which the cold is constantly maintained in the core, determine the zones $b$ and $a$ of decreasing elasticity or resiliency. This method, based on the same principle as that which we described in our Patent No. 640,644, of 1900, avoids entirely the successive congelations or coolings down of the entire mass of rubber. It is evident that this process can only be employed for hollow bodies or for those for the cooling and baking of which a mold having a hollow core may be employed. It is of course quite allowable not to cause a circulation of the liquid of low temperature in the core $n$ except after the first vulcanization of the entire mass; but in any case in establishing this circulation of liquid before any vulcanization or baking we can, as hereinbefore indicated, preserve in the india-rubber an internal unbaked zone, which retains its properties of cohesion and the same capacity for being sealed as natural rubber possesses. It is evident that if a similar rubber be employed for covering the air-chamber $d$ of a pneumatic tire, such as the one shown in transverse section in Fig. 4, the internal zone $c$ of the cover, while forming one piece with the said cover, will play the part of covers of natural rubber, which it has been attempted to employ over air-tubes and on covers for the automatic closing of punctures. If such covers have only hitherto given a temporary or illusory protection, it is because the independent india-rubber does not follow the deformations of the air-tube and of the cover and at length separates itself from the main piece, whether air-tube or cover. The internal plastic zone $c$ has in addition the advantage of forming at $f$, Fig. 4, over the whole surface of contact an absolutely-tight joint, particularly efficacious if the faces of the circular part or of the lips of the india-rubber be corrugated or ribbed. The same advantages exist when the tire is not provided with an air-tube, and these advantages are even more evident in this construction, as they allow of a pneumatic tire being formed without a separate air-tube in the manner shown in transverse section in Fig. 5. In this example the air-chamber $c$, which is open on its internal periphery, adheres directly to the soft layer $b$ of the cover or to a layer $t$ of canvas solution secured to the layer $b$. This inclosing chamber $c$ of less vulcanization will be limited or closed by an interior band or strip $i$, solutioned or otherwise to its walls. The space $o$ left free between the chamber $c$ and the strip $i$ may be filled with compressed air, which is injected therein through a valve $v$. The advantage of this arrangement consists more particularly in the facility which is afforded for the inspection and repairing of the air-chamber by opening out the base part.

We declare that what we claim is—

A process for the manufacture of hollow covers or casings for pneumatic tires for vehicle-wheels and other like articles of india-rubber, which consists in producing in the interior of the article, a circulation of liquid at a low temperature before or after a preliminary vulcanization, and in maintaining said circulation while the article is subjected to successive vulcanizations extending to decreasing depths into the rubber material, substantially as hereinbefore described and shown.

In witness whereof we have hereunto set our hands in presence of two witnesses.

HENRI FALCONNET.
MAURICE PERODEAUD.

Witnesses:
   EDWARD P. MACLEAN,
   ANDRÉ MOSTICKER.